United States Patent [19]

Hewitt

[11] Patent Number: 4,790,239
[45] Date of Patent: Dec. 13, 1988

[54] SYSTEM FOR BREWING AND SERVING A HOT BEVERAGE

[75] Inventor: Alan R. Hewitt, Sante Fe, N. Mex.

[73] Assignee: Starbucks Corporation, Seattle, Wash.

[21] Appl. No.: 35,833

[22] Filed: Apr. 8, 1987

[51] Int. Cl.⁴ .............................................. A47J 31/00
[52] U.S. Cl. ....................................... 99/279; 99/285; 99/291
[58] Field of Search ................. 99/279, 288, 290, 291, 99/300, 316, 323, 275, 307, 285, 293, 294; 426/433

[56] References Cited

U.S. PATENT DOCUMENTS

| | | | |
|---|---|---|---|
| 607,352 | 7/1898 | Dunlap | 99/291 |
| 2,547,481 | 4/1951 | McDonald | 99/290 |
| 2,830,528 | 4/1958 | Arnett | 99/290 |
| 3,399,665 | 9/1968 | Sprague | 222/146.1 |
| 3,642,176 | 2/1972 | Dreibelbis et al. | 222/146.1 |
| 3,804,344 | 4/1974 | Perry | 222/146.1 |
| 4,363,262 | 12/1982 | Pinckley | 99/290 |
| 4,532,142 | 7/1985 | Dean | 99/316 |

*Primary Examiner*—Robert W. Jenkins
*Attorney, Agent, or Firm*—Seed and Berry

[57] ABSTRACT

A method and system for brewing one or more hot beverages, such as gourmet coffees. The gourmet coffee is brewed, at a brewing temperature, in the liners of a brewing urn. After brewing, the coffee can be transferred to any one of three storage tanks by means of manual or solenoid valves, and, if desired, a gravity-assist pump. The shelf-life of the brewed coffee is increased substantially when stored at a serving temperature which is lower than the brewing temperature. Coffee contained in feed lines leading from each of the storage tanks passes through a pressurizing line to a tap tower located to provide efficient service to the coffee-purchasing customers. Hot water from the water jacket of the brewing urn is circulated in hot water lines retained in close proximity to the feed lines between storage tanks and the tap tower, thereby keeping the coffee in the feed lines at a desirable serving temperature. A control panel connected to level sensors in each of the storage tanks provides visible and audible indications to the operator that the supply of coffee in a particular storage tank is running out, so that the operator can brew a new batch of coffee. When the empty volume in a particular storage tank is adequate to store an additional full batch of freshly brewed coffee, the operator receives a second visible indication from the control panel. The operator can control pumps and valves from the control panel and can read the temperature of the coffee in each of the storage tanks.

17 Claims, 3 Drawing Sheets

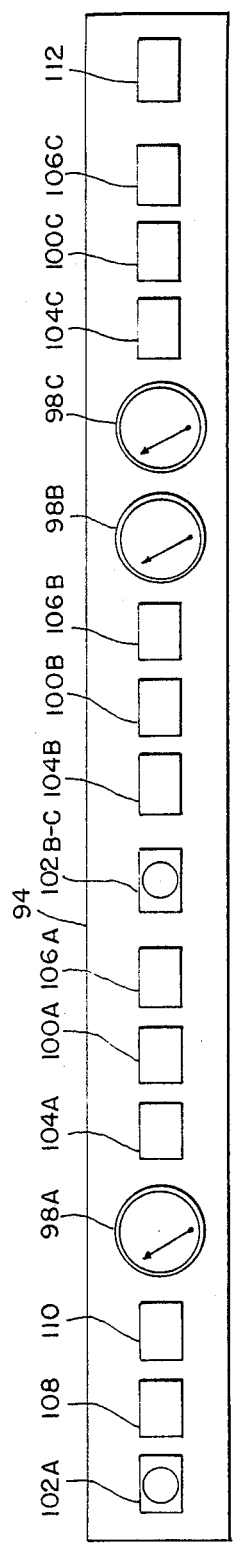
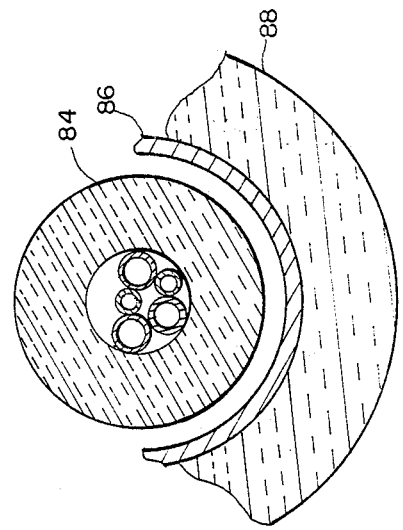
FIG. 4
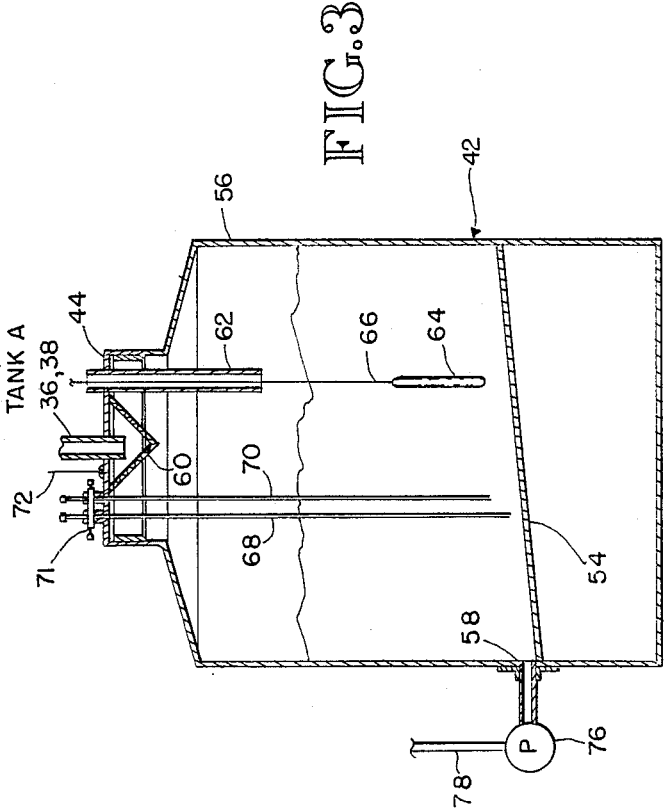
FIG. 3
FIG. 5

SYSTEM FOR BREWING AND SERVING A HOT BEVERAGE

TECHNICAL FIELD

This invention relates to a method and system for brewing and serving hot beverages, and more particularly to a system for brewing hot beverages such as coffee, storing the brewed beverage at a temperature lower than the brewing temperature, and serving the beverage at a point remote from the brewing or storing point at serving temperature and without degradation of the quality of the beverage.

BACKGROUND ART

Hot beverages for sale in restaurants or specialty shops are typically brewed at a high temperature in a large vessel, such as a brewing urn. The beverage is retained in the same urn at the brewing temperature until purchased by a customer. Such systems result in rapid degradation of the quality of the beverage. This is especially true for fragile beverages such as gourmet or speciality coffees. Typically the shelf life for a fine coffee stored at the brewing temperature will not exceed 15 or 20 minutes. This is not acceptable for commercial purposes, where large volumes of coffee must be brewed and stored for sale to customers.

More recently, the industry has become more aware of the need for storage systems which will preserve the quality of fragile and expensive specialty beverages such as fine coffees. One solution has been to manually transfer the brewed beverage into an insulated container such as a Thermos ® bottle or an "airpot" for storage at a temperature somewhat below the brewing temperature, and closer to the proper serving temperature. Shelf life is thereby extended up to two hours before the quality of the beverage noticeably degrades. A second solution is to brew the beverage directly into an insulated holding container.

Contemporary commercial practices require that a restaurant or speciality shop such as a gourmet coffee shop have an atmosphere conducive to interaction between the serving personnel and the customer. Efficient and pleasant interactions between employees and customers are hampered by bulky machinery on or near the front counter, or by the necessity of serving personnel to turn away from the customer to prepare a cup of coffee or other beverage. This problem can be overcome using a system in which the serving taps are remote from the brewing or storage machinery. Such systems that exist in the prior art, however, do not store and deliver the coffee at the moderate temperature necessary for long shelf life of th coffee.

Further, specialty shops thrive on a large volume of customers who make small purchases of one or two cups at a time, and who require quick service a high volume peak times such as early morning and lunch hour. These shops depend on the ability to serve their customers quickly and efficiently, with courteous, polite and congenial service, while delivering a high quality product at the proper serving temperature. Prior systems for brewing and serving specialty beverages such as fine coffees are not adequate to meet these requirements.

DISCLOSURE OF THE INVENTION

It is therefore an object of the present invention to provide a brewing and serving system for hot beverages which will brew large volumes of beverage at a high temperature, and store the beverage before serving at a temperature lower than the brewing temperature.

It is still another object of the present invention to provide a brewing and serving system for hot beverages which will deliver the beverage for sale at a location remote from the brewing and storing locations while maintaining the beverage at a proper serving temperature.

It is still another object of the present invention to provide a brewing and serving system for hot beverages which will prevent degradation of the beverage from excess temperature or other factors.

It is still another object of the present invention to provide a brewing and serving system for hot beverages which will deliver the beverage for sale at a location remote from the brewing and storing locations while allowing efficient serving of quality beverages and maintaining a pleasant and courteous interaction between customer and server.

It is yet another object of the present invention to provide an integrated brewing and serving system for hot beverages such as specialty coffees which will efficiently transfer the beverage between the brewing location and a storage location with minimum handling required of service personnel.

It is still another object of the present invention to provide a brewing and serving system for hot beverages such as specialty coffees which will automatically indicate the time for brewing a new batch of beverage, and the time for transferring a freshly brewed batch of beverage from the brewing location to the storage location.

It is still another object of the present invention to provide a brewing and serving system for hot beverages such as specialty coffees which will allow simultaneous brewing and service of a plurality of different beverages at one time.

Still another object of the invention is to provide a method for brewing and serving a hot beverage by delivering the beverage at a point remote from the brewing and storing locations at a proper serving temperature and without degradation of the quality of the beverage.

These and other objects of the invention, which will become apparent as the invention is more fully described below, are obtained by providing a hot beverage brewing and serving system. In a preferred embodiment, A conventional type urn is used to brew one or more hot beverages. Promptly after brewing is complete the beverages are transferred to insulated storage tanks for storage at a temperature that is conductive to a long shelf life for the beverage. The storage tanks are in turn connected by feed lines to a remote serving tap where the beverage is dispensed for sale to customers. The feed lines are maintained at a high temperature so that the beverage in the feed line is at an acceptable serving temperature even if it has been sitting in the line for a period of time.

In general, the preferred embodiments of the hot beverage brewing and serving system described herein comprise a brewing vessel for brewing separate batches of hot beverages, an insulated storage tank to store a batch of a beverage at a serving temperature so that the beverage from the brewing vessel may be simultaneously brewed and served, and a serving tap remote from the brewing vessel and storage tanks. The system further comprises feed lines for carrying the beverage from the brewing vessel to the storage tank, and from the storage tank to the serving tap, and means for maintaining the beverage in the feed lines between the storage tank and the tap at the serving temperature.

In a preferred embodiment, a gourmet hot beverage brewing and serving system comprises a plurality of brewing liners for brewing separate batches of brewed hot beverage, the liners being surrounded by a jacket of hot water, one or more insulated storage tanks, each storage tank storing beverages brewed in the liners at a serving temperature, first feed lines for transferring the brewed beverage from the liners to the storage tanks, and one or more pumps in the first feed lines for facilitating transfer of beverage from the urns to the storage tanks. The pump or pumps are controlled by a timer pre-set for duration of operation sufficient for transferring a full batch of beverage from a liner to a storage tank. The system further comprises serving taps for serving the beverages. The serving taps being remote form the brewing urn and from the storage tanks, second feed lines for transferring the stored beverages from the storage tanks to the serving taps for service, and pumps in the second feed lines for pressurizing the beverages so that a particular beverage may be served by opening the tap connected to the second feed line transferring the particular beverage. In addition, the system comprises hot water lines connected to the water jacket for circulating the hot water in proximity to the second feed lines and a pump for circulating the hot water through the hot water lines to keep the beverages in the second feed lines at a serving temperature, thermal insulation surrounding the hot water lines and the second feed lines which are in proximity to each other, a first level indicator in each storage tank for indicating when the level of beverage in the tank is sufficiently low that a new batch of beverage for that tank should be brewed, a second level indicator in each storage tank for indicating when a new batch of brewed beverage may be transferred to the tank, and a temperature gauge in each storage tank for monitoring the temperature in each tank and an external indicator connected to the gauge for reading the monitored temperature.

In general, the preferred method of the present invention comprises the steps of brewing the hot beverage in a vessel, promptly transferring the brewed beverage to a storage tank for storing the beverage at a certain temperature so as to minimize the time that the beverage is kept at the brewing temperature, and transferring the beverage through a feed line from the storage tank to a serving tap. The preferred method further comprises the steps of warming the feed line between the storage tank and the serving tap to keep the beverage in the feed line at a serving temperature, and operating the serving tap to dispense the hot beverage at the serving temperature.

BRIEF DESCRIPTION OF THE DRAWINGS

FIG. 3 is a cross-sectional view of a storage tank of the brewing and serving system of the present invention taken across the lines 3—3 of FIG. 1.

FIG. 4 is a cross-sectional view showing the configuration of feed lines and hot water lines taken across the lines 4—4 of FIG. 1.

FIG. 5 is a close-up view of the control panel of the brewing and serving system of the present invention.

BEST MODE FOR CARRYING OUT THE INVENTION

Figure 1:
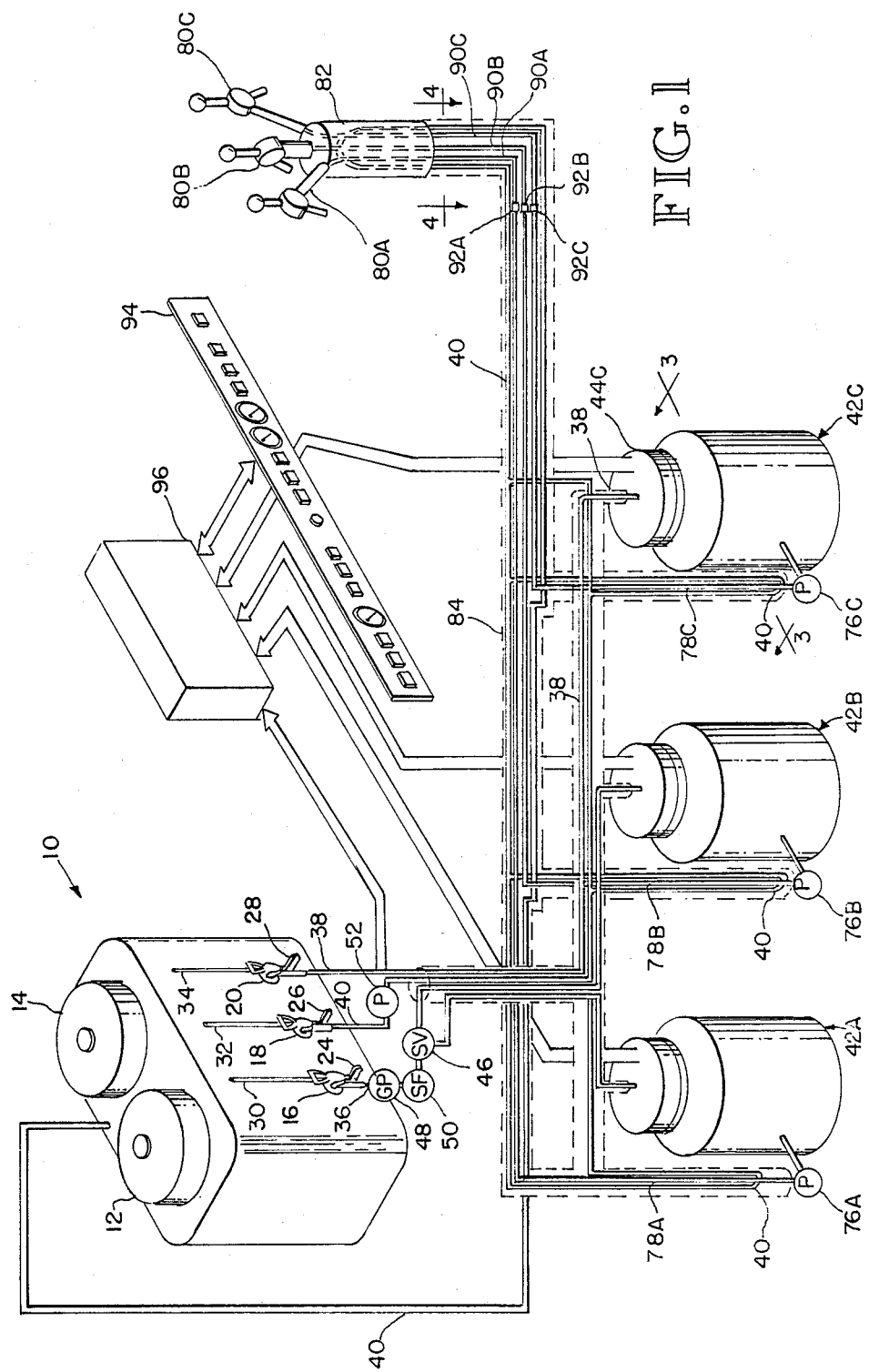
FIG. 1 is a schematic view of the system for brewing and serving a hot beverage of the present invention.
Figure 2:
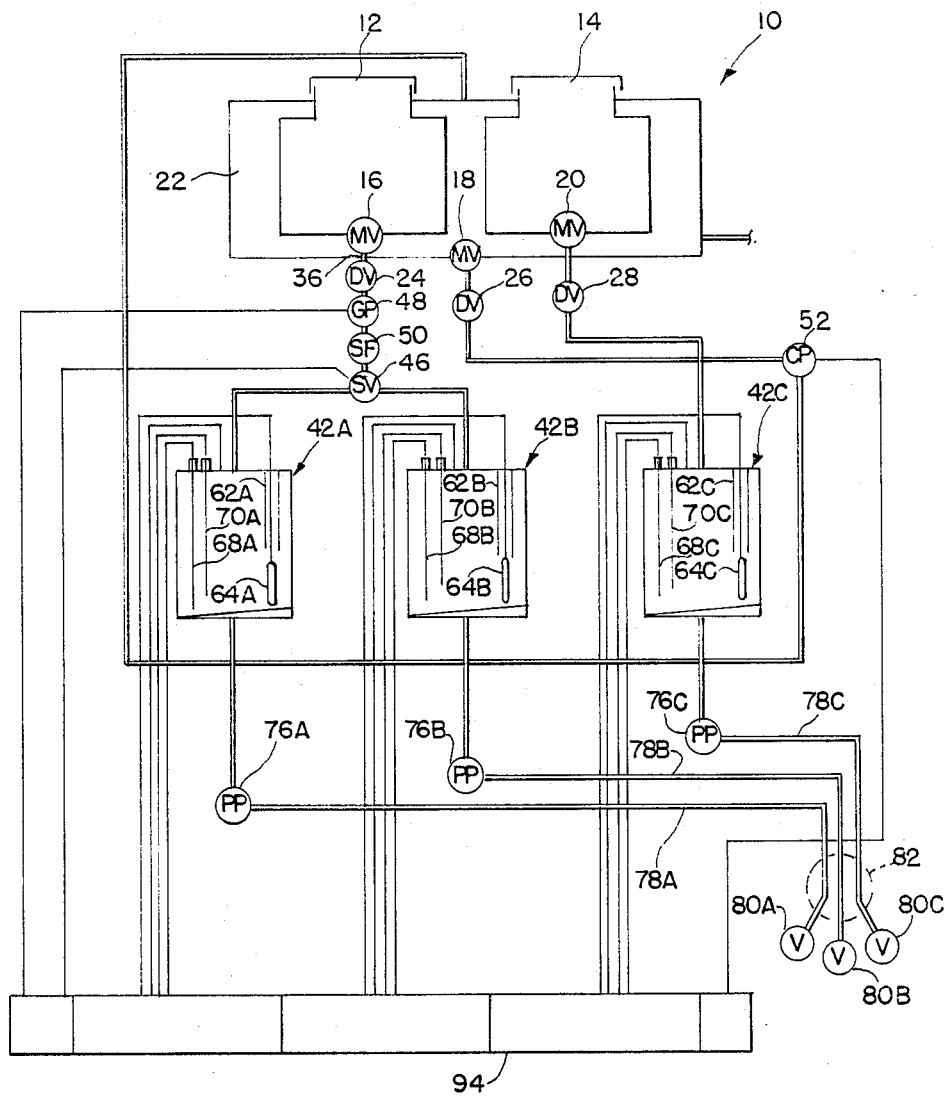
FIG. 2 is a schematic block diagram showing beverage handling and electrical hardware of the brewing and serving system of the present invention.

As will be seen by reference to the drawings, the hot beverage brewing and serving system of the present invention contains a brewing vessel such as a brewing urn which may have one or more brewing liners for brewing a hot beverage such as coffee. FIG. 1 shows a brewing urn 10 with two separate liners 12 and 14 and three faucets 16, 18, and 20. Such an urn may be similar to a standard automatic coffee urn such as Insulated urn Model No. INS100 available from Cecilware Corporation, 43-05 20th Avenue, Long Island City, N.Y. 11105. The liners are surrounded by a hot water filled jacket 22 of FIG. 2, which is maintained at a temperature of approximately 205° F. and which provides the heat and water for brewing the beverage in the liners. Faucets 16 and 20 are connected to each of the two liners and faucet 18 is connected to the water jacket.

The standard urn is modified by the addition of stainless steel or Telfon ® drop valves 24, 26 and 28 to the three faucets of the urn. These valves are plumbed into the lower side of the faucets by tapping threads into the bottom of each faucet stem below the sight glass 30, 32 or 34, and threadedly attaching the valve. These valves will override the faucets, and when opened will allow fluid to flow into stainless steel or Teflon ® feed lines 36 and 38 and a copper hot water line 40, which are attached to the valves. Drop valves 24 and 28 allow brewed beverage to drain from the two liners 12 and 14. Valve 26 allows hot water to drain from the hot water jacket 22 surrounding the liners.

Feed lines 36 and 38 run from drop valves 24 and 28 to storage tanks 42A, 42B and 42C, and carry fluid from the brewing urn to the storage tanks. Feed lines can be made from non-corrosive materials such as stainless steel or Teflon ®, and can be connected by non-corrosive fittings made from materials such as Kynar ®. The storage tanks will normally be located at a position below the brewing urn such that fluid will flow by force of gravity from the urn through the feed line and into the storage tank. A feed line can run to a single storage tank, as in the case of feed line 38 which carries fluid to storage tank 42C. Feed line 38 enters storage tank 42C through lid 44c, as will be described in greater detail subsequently.

Alternatively, a feed line can carry fluid to a plurality of storage tanks, as in the case of feed line 36, which directs fluid toward storage tanks 42A and 42B. Three-way solenoid valve 46 can be electrically operated to direct fluid to either tank 42A or 42B. The solenoid valve allows coffee to flow to one tank (42A) when it is in the off position. When energized, the coffee will flow to tank 42B. A description of the electrical controls will be provided subsequently.

The transfer of fluid from the brewing urn liners 12 and 14 to the storage tanks can be facilitated by gravity assist pumps such as pump 48. These pumps are especially advantageous when the storage tanks are located at a distance from the brewing urn. The pumps may also effect transfer to fluid in the case where the storage tanks are located in a position above the level of the brewing urn. A sediment filter such as filter 50 may be located in the feed lines to prevent the passage of sediment through the feed lines. The sediment could cause the solenoid valve to not operate properly.

Hot water line 40 carries hot water for maintaining the temperature of the fluid carried by the feed lines. Hot water is supplied to the feed line from the hot water jacket 22 of the brewing urn, and is circulated through the hot water line 40 and back to the hot water jacket by hot water circulating pump 52.

FIG. 3 shows an insulated storage tank 42 for storing brewed beverage at a temperature that extends the shelf life of the brewed beverage such as coffee to approximately two hours. It is well known that coffee will quickly deteriorate in quality if it is stored at the high temperatures of 200°–205° Fahrenheit required for brewing, but that the degradation will be substantially diminished if the coffee is stored at a temperature closer to the desired serving temperature range of 165°–180° Fahrenheit. The preferred embodiment utilizes a modified standard stainless steel hot coffee carried such as those made by Cecilware Corporation. The volume of the storage tank is defined between a false bottom 54, circular wall 56, and lid 44. False bottom 54 slopes downwardly toward faucet connection 58, for emptying fluid from the container. The lid of the Cecilware tank is modified to receive feed line 36 or 38, which extends beyond the lid into the interior of the tank to prevent spillage of fluid onto the interior of the lid. Filter 60 removes sediment from the fluid that may be carried through the feed lines and into the tap and the final beverage.

Storage tank lid 44 is fitted with a length of metal tubing 62 for insertion of copper temperature probe 64 for monitoring the temperature of fluid inside the tank. The temperature probe 64 and the lower length of temperature probe cable 66 is chrome plated for corrosion resistance when immersed in an acidic fluid such as coffee.

Lid 44 is also adapted to accept fluid level probes 68 and 70, whose function is to be fully described later. These probes are inserted through openings in the lid 44, and are adjustably secured by a clamp 71 and set screw. Adjustment of the probes is accomplished by loosening the set screw and manually raising and lowering the probes, thereby setting the probes to respond to varying levels of fluid within the tank. Electrical ground contact 72 is attached to lid 44 to complete the level sensing circuit comprising probes 68 and 70.

Faucet connection 58 connects with faucet 74, which has been adapted to fit feed line pressurizing pumps 76A, 76B and 76C. Referring again in FIG. 1, these pumps pressurize feed lines 78A, 78B and 78C which carry fluid from storage tanks 42A, 42B, and 42C to the remote serving taps 80A, 80B and 80C. These taps are located on tap tower 82, which may be a modification of a standard beer tap tower. The modification consists of adding a third tap to a standard double head model tap tower.

The feed lines are normally continuously pressurized, and are non-circulating, so that when the serving taps are not activated, the fluid remains dormant and pressurized in the feed lines. When the tap is activated, the pressure in the lines forces fluid out of the tap for dispensing to a customer.

Feed lines 78 A-C are bundled together with hot water line 40 for the purpose of maintaining the fluids in the feed lines within a desired serving temperature range. To minimize heat loss, the bundled lines are enclosed in an insulating jacket 84 for their full length. This can be more easily seen in cross sectional view FIG. 4. In the preferred embodiment, the insulating jacket is a closed cell foam cylinder two inches in diameter. The foam cylinder is in turn enclosed within steel conduit 86, which facilitates the installation of the feed and water lines between the storage tanks and tap tower 82. An additional two inches of foam insulation 88 surrounds the steel conduit 86. FIG. 4 shows a preferred embodiment in which both the hot water supply line and the hot water return line are bundled with the feed lines within the insulation.

Each of the taps in the tap tower is fitted with a stainless steel drop 90A, 90B or 90C, which connects to the feed lines 78A, 78B and 78C by means of Kynar fittings 92A, 92B and 92C. Hot water line 40 enters into the interior of the tap tower to maintain the fluid in the steel drops inside the tap lower as well as the fluid in the feed lines at serving temperature, so that when the tap is activated even after a period of inactivity where the fluid remains dormant in the feed lines and steel drops, the fluid that emerges from the tap is immediately at serving temperature and suitable for sale to customers.

The embodiment of the present invention may contain more than one tap tower connected to feed lines 78 A-C. Where there exists a pressure differential between two tap towers, the pressure may be equalized by means of a balancing valve on one of the tap towers comprising a nylon pinch valve which can restrict the flow of fluid through the Teflon ® feed line to the tap tower. This will produce equal flows through corresponding taps in the two different tap towers.

Also shown in FIG. 1 are control panel 84 and circuit box 96. Circuit box 96 receives signals from temperature probes 64 A-C and fluid level probs 68 A-C and 70 A-C, and in response produces signals that are sent to control panel 94 and pumps and solenoid valves of the brewing and serving system.

FIG. 5 contains a close-up view of control panel 94. The control panel can be seen to comprise a collection of temperature gauges 98 A-C, visible reserve level indicators 100 A-C, audible prompting signals 102, and visible "empty tank" signals 104 A-C. In addition, control panel 94 contains pressurizing pump switches 106 A-C, gravity assist pump switch 108, solenoid valve switch 110, and circulating pump switch 112.

Control panel 94 receives signals from circuit box 96 to cause indications on temperature gauges 98 A-C. The signals originate from the temperature probes 64 A-C, respectively. Control panel 94 also receives signals from circuit box 96 indicative of fluid levels in storage tanks 42 A-C. Fluid level probes 68 and 70 (in FIG. 3) detect upper and lower fluid levels through a resistance technique. When the fluid level covers at least the lower end of fluid level probes 68 or 70, the electrical circuit comprising the respective fluid level probe and electrical ground contact 72 is completed. Completion of this circuit is detected by a resistance sensor circuit such as those produced by National Controls Corporation. When the fluid level probe circuit is opened, because fluid level has fallen below the fluid level probe, the resistance sensor circuit produces an alarm condition in circuit box 96, which is sent to audible prompting signals 102 and the corresponding visible indicators 100 A-C, or 104 A-C. Visible reserve level indicators 100 A-C detect when the end of respective fluid level probes 70 A-C are uncovered in storage tanks 42 A-C. Visible empty tank signals 104 A-C detect when the end of fluid level probes 68 A-C are uncovered by the fluid level in storage tank 42 A-C.

When activated, in conjunction with visible reserve level indicators 100 A-C, audible prompting signals 102 are activated for a brief period of time (e.g. 15 seconds as controlled by a timer) to call the reserve level condition to the attention of an operator.

As shown in FIG. 5, 102 A and 102 B-C, are respectively activated in response to reserve level indications by sensors 70 A and 70 B-C, respectively.

Pressurizing pumps 106 A-C can be independently toggled to cause pressurizing pumps 76 A-C to turn on/off. Gravity assist pump switch 108 activates operation of gravity assist pump 48 for a pre-determined period of time sufficient to fully transfer a batch of fluid from the brewing urn to a storage tank. Solenoid valve switch 100 toggles to cause solenoid valve 46 to divert fluids to storage tanks 42 A and 42 B, respectively. Finally, circulating pump switch 112 toggles to cause circulating pump 52 to turn on/off.

The operation of the preferred embodiment of the system for brewing and serving a hot beverage begins by brewing batches of distinct hot beverages, for instance different blends of coffee, in each of the two liners 12 and 14 of the brewing urn 10. When brewing is complete, the operator activates drop valves 24 and 28 and if desired gravity assist pumps 48, to transfer the brewed coffees from the urn liners to the storage tanks. The coffee from liner 14 will flow through feed line 38 to tank 42 C. The coffee from liner 12 will flow through feed line 36 to either tank 42 A or 42 B, depending on the setting of solenoid valve 46. After the coffee is transferred from liner 12 to one of the tanks, a second batch of coffee may be brewed in liner 12 and transferred to the other of the two tanks served by feed line 36 by activating solenoid valve 46 using solenoid valve switch 110.

As each of the storage tanks is substantially filled by the transfer of coffee from an urn liner to the tank, the fluid level in the tank rises above the fluid level probes 68 and 70, extinguishing visible indicators 100 A-C and 104 A-C. The feed lines 78 A-C are pressurized by activating the feed line pressurizing pumps 76 A-C by means of pressurizing pump switches 106 A-C on control panel 94. Hot water circulating pump 52 is activated by means of circulating pump switch 112 to circulate hot water through hot water line 40 in order to maintain the coffee in the pressurized feed line at serving temperature.

Coffee is dispensed for sale to customers by activating serving taps 80 A-C according to the customer's desires. This embodiment allows for efficient and pleasant service, especially during times of high volume consumption, by allowing the server to remain in one place facing the customer while dispensing several different types of beverage.

As coffee is dispensed, the level of coffee in the storage tanks decreases. When fluid level probe 70 in any of the tanks is uncovered by the decreasing level of fluid, the corresponding visible reserve level indicator 100 and the corresponding audible prompting signal 102 are activated. This signal prompts the operator to initiate the brewing of a fresh batch of coffee in the urn liner that feeds the storage tank for which the reserve level and prompting signals have been received. These signals allow the operator to know the proper timing for brewing a new batch of coffee, so that the new batch will be held in the high temperature urn liner for a minimum amount of time after brewing is complete, and minimum degradation of coffee quality due to high temperature will occur.

As the level of coffee in the storage tank continues to decrease due to continued dispensing to customers, and as the fresh batch of coffee is brewing, the end of fluid level probe 68 is uncovered. This sets off the corresponding empty tank signal 104 on control panel 94, indicating to the operator that there is sufficient room in the storage tank for the fresh batch of coffee. The operator then activates the corresponding drop valve 24 or 28 and, if desired, gravity assist pump 48, to transfer the fresh batch of coffee from the urn liner to the empty storage tank. Once again, fluid level probes 68 and 70 are covered by fluid and the indicators 100 and 104 are extinguished.

Because the rates of consumer consumption of the various coffee blends kept in the storage tanks varies, the period of time between the activation of the reserve level indicator 100 and the empty tank signal 104 can be correlated to the time required to brew a fresh batch of coffee by adjusting the relative vertical positions of the fluid level probes 68 and 70. Thus the time that the fresh batch of coffee will remain in the high temperature brewing urn after brewing is completed will be minimized. At the same time, the time lag between the consumption of one batch of a particular blend of coffee and the availability of the next batch of the blend for sale to customers can be minimized.

Temperature of the coffee in the storage tanks can be monitored by viewing temperature gauges 98 A-C. If the temperature of the coffee falls below an acceptable serving temperature, the remaining coffee can be discarded and a new batch brewed. The gauge can also be monitored as a fresh batch of coffee is transferred into the storage tank to assure that the batch was brewed at a sufficiently high temperature to produce quality coffee.

Using the present system, a plurality of different types of hot beverages such as different blends of coffee can be simultaneously brewed and served, with no time lag between consumption of one batch of beverage and availability of a fresh batch to be served. The present system also provides for maintenance of high quality of the brewed beverage by allowing minimum time for the beverage at high brewing temperature, allowing the beverage to be stored at a lower temperature with increased shelf life.

From the foregoing it will be appreciated that, although specific embodiments of the invention have been described herein for purposes of illustration, various modifications may be made without deviating from the spirit and scope of the invention. Accordingly, the invention is not limited to the preferred embodiments disclosed herein, but rather includes all equivalent ebodiments.

I claim:

1. A hot beverage brewing and serving system, comprising:
   a brewing vessel for brewing separate batches of hot beverages at a temperature in a brewing temperature range;
   an insulated storage tank for storing a batch of a beverage brewed in the brewing vessel at a temperature in a storage temperature range so that the beverage from the same brewing vessel may be simultaneously brewed and served, the storage temperature range being lower than the brewing temperature range;

a serving tap remote from the brewing vessel and storage tank;

a first feed line for carrying the beverage from the brewing vessel to the storage tank;

a second feed line for carrying the beverage from the storage tank to the serving tap for dispensing the hot beverage; and means for maintaining the beverage in the second feed line at a serving temperature so that when the serving tap is operated after a period of inoperation, it serves the beverage at the serving temperature, the serving temperature being lower than the storage temperature range.

2. The hot beverage brewing and serving system of claim 1 wherein the means for maintaining the beverage in the second feed line at the serving temperature comprises a hot water line running in proximity to the second feed line, whereby heat is exchanged between the hot water line and the second feed line.

3. The hot beverage brewing and serving system of claim 1, further comprising means to indicate the level of the beverage in the storage tank, whereby an operator of the system can can be alerted to brew a batch of the beverage for subsequent storage in the storage tank when the level of the beverage in the storage tank falls below a predetermined reserve level.

4. A gourmet hot beverage brewing and serving system comprising:

a plurality of brewing liners for brewing separate batches of brewed hot beverage, the liners being surrounded by a jacket of hot water;

one or more insulated storage tanks, each storage tank for storing the beverages brewed in the liners at a serving temperature;

first feed lines for transferring the brewed beverage from the liners to the storage tanks;

one or more pumps in the first feed lines for facilitating transfer of beverage from the liners to the storage tanks, the pump or pumps being controlled by a timer pre-set for a duration of operation sufficient for transferring a full batch of beverage from a liner to a storage tank;

serving taps for serving the beverages, the serving taps being remote from the brewing vessel and from the storage tanks;

second feed lines for transferring the stored beverages from the storage tanks to the serving taps for dispensing the beverage;

pumps in the second feed lines for pressurizing the beverages in the second feed lines so that a particular beverage may be dispensed by opening the tap connected to the second feed line, transferring the particular beverage;

hot water lines connected to the water jacket surrounding the liners for circulating the hot water in proximity to the second feed lines and a pump for circulating the hot water through the hot water lines, such that the hot water lines transfer heat from the brewing water to the second feed lines to keep the beverages in the second feed lines at the serving temperature;

thermal insulation surrounding the hot water lines and the second feed lines which are in proximity to each other;

a first level indicator in each storage tank for indicating when the level of beverage in the tank is sufficiently low that a new batch of beverage for the tank should be brewed;

a second level indicator in each storage tank for indicating when the tank is sufficiently empty that a new batch of brewed beverage may be transferred to the tank; and a temperature gauge in each storage tank for monitoring the temperature of the beverage in each tank and an external indicator connected to the gauge for reading the monitored temperature.

5. The hot beverage brewing and serving system of claim 4 wherein the second feed lines are selected from the group consisting of Teflon ®, stainless steel, and Kynar ® feed lines.

6. The hot beverage brewing and serving system of claim 4 further comprising:

a solenoid valve in a first feed line for selectively directing the brewed beverage from one of the brewing liners to one of the one or more storage tanks.

7. The hot beverage brewing and serving system of claim 4 wherein the serving tap comprises a stainless steel tap tower having a plurality of spigots, each spigot connected to a distinct second feed line, such that different beverages may be stored in the storage tanks and simultaneously served from the same serving tap.

8. The hot beverage brewing and serving system of claim 4 wherein the hot water lines are copper pipes.

9. A hot beverage brewing and serving system, comprising:

a brewing vessel for brewing separate batches of hot beverages at temperatures in a brewing temperature range;

a plurality of insulated storage tanks for separately storing the separate batches of hot beverages at temperatures in a storage temperature range, so that a beverage may be simultaneously brewed in a particular brewing vessel and served from a particular storage tank, the storage temperature range being lower than the brewing temperature range;

a serving tap remote from the brewing vessel and the plurality of storage tanks;

first feed lines for carrying the beverages from the brewing vessel to the plurality of storage tanks;

second feed lines for carrying the beverages from the plurality of storage tank to the serving tap; and means for maintaining the beverages in the second feed line at a serving temperature so that when the serving tap is operated after a period of inoperation, it serves the beverages at the serving temperature, the serving temperature being lower than the storage temperature range.

10. The hot beverage brewing and serving system of claim 9, further comprising:

a solenoid valve in a first feed line for selectively directing the brewed beverage from the brewing vessel to one of the plurality of storage tanks.

11. A hot bevrage brewing and serving system, comprising:

a plurality of brewing liners for brewing separate batches of brewed hot beverage, the liners being surrounded by a jacket of hot water;

an insulated storage tank for storing a batch of a beverage brewed in the brewing vessel at a temperature in a storage temperature range so that the beverage from the same brewing vessel may be simultaneously brewed and served, the storage temperature range being lower than the brewing temperature range;

a serving tap remote from the brewing vessel and storage tank;

a first feed line for carrying the beverage from the brewing vessel to the storage tank;

a second feed line for carrying the beverage from the storage tank to the serving tap for dispensing the hot beverage; and means for maintaining the beverage in the second feed line at a serving temperature by circulating water from the hot water jacket in proximity to the second feed line and back to the hot water jacket, whereby heat is exchanged to the second feed line.

12. The hot beverage brewing and serving system of claim 11, further comprising means to indicate the level of the beverage in the storage tank, whereby an operator of the system can be alerted to brew a batch of the beverage for subsequent storage in the storage tank when the level of the beverage in the storage tank falls below a predetermined reserve level.

13. The hot beverage brewing and serving system of claim 11, further comprising means to indicate the temperature of the beverage in the storage tank, whereby an operator of the system can be alerted to discard a batch of the beverage when its temperature falls below the serving temperature.

14. The hot beverage brewing and serving system of claim 13, further comprising means to indicate the level of the beverage in the storage tank, whereby an operator of the system can be alerted to brew a batch of the beverage for subsequent storage in the storage tank when the level of the beverage in the storage tank falls below a predetermined reserve level.

15. The hot beverage brewing and serving system of claim 11, further comprising one or more additional storage tanks for separately storing the separate batches of hot beverages at temperatures in the storage temperature range, so that a beverage may be simultaneously brewed in a particular brewing vessel and served from a particular storage tank, the storage temperature range being lower than the brewing temperature range.

16. The hot beverage brewing and serving system of claim 15, further comprising:

a solenoid valve in a first feed line for selectively directing the brewed beverage from the brewing vessel to one of the storage tanks.

17. The hot beverage brewing and serving system of claim 15 wherein the serving tap comprises a tap tower having a plurality of spigots, each spigot connected to a distinct second feed line, such that different beverages may be stored in the storage tanks and simultaneously served from the same serving tap.

* * * * *